Figure 1:
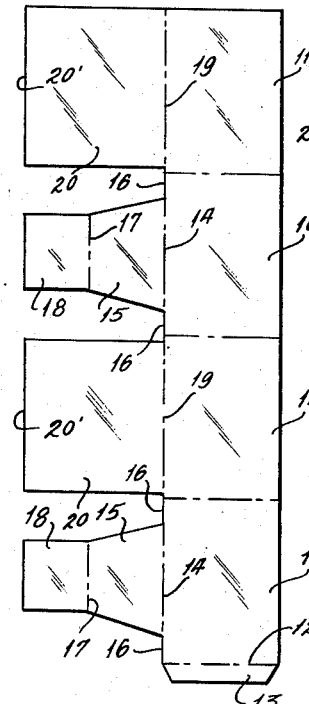

Oct. 26, 1954     H. H. STRAUSS     2,692,747

LOADING PLATFORM AND SUPPORT THEREFOR

Filed May 23, 1952     2 Sheets-Sheet 1

INVENTOR:
HERMAN H. STRAUSS
By Gravely, Lieder, Woodruff & Dees
ATTORNEYS.

Oct. 26, 1954

H. H. STRAUSS 2,692,747

LOADING PLATFORM AND SUPPORT THEREFOR

Filed May 23, 1952

2 Sheets-Sheet 2

INVENTOR:
HERMAN H. STRAUSS
By Gravely, Lieder, Woodruff & Dees
ATTORNEYS.

Patented Oct. 26, 1954

2,692,747

UNITED STATES PATENT OFFICE 2,692,747

LOADING PLATFORM AND SUPPORT THEREFOR

Herman H. Strauss, St. Louis, Mo., assignor to Gaylord Container Corporation, St. Louis, Mo., a corporation of Maryland Application May 23, 1952, Serial No. 289,694

9 Claims. (Cl. 248—120)

This invention appertains to a pallet and more particularly to a novel loading platform having high strength supporting members particularly adapted to be constructed of solid fibreboard, corrugated fibreboard or any other suitable material.

It has been customary in the past when providing a support of fibreboard or similar material for pallets, skids, or other like devices, to form the supporting members of many layers of material, thus utilizing only a small fraction of the ultimate strength of the material. This practice was formerly believed necessary due to the inherent lack of rigidity of many of the fibreboard materials. It is therefore an object of this invention to provide a self-contained supporting column for a loading pallet which is designed to utilize the inherent strength of the supporting material thereby providing a maximum vertical and horizontal strength and requiring a minimum amount of material.

It is a further object of this invention to provide a supporting leg for a loading platform which effectively resists horizontal displacement and shearing forces in all directions.

It is a further object to provide a unitary supporting leg which may be readily and rigidly attached by manual means to a loading platform without requiring the use of stitches, glue or any other fastening means and yet easily and quickly removed and collapsed for storage and/or reuse.

Another object is to provide a supporting leg or column having a bottom surface providing vertical and angularly disposed edges to effectively engage the supporting surface beneath to prevent sliding and slippage thereon.

A still further object is to provide a supporting leg having a minimum lateral area, so as to provide maximum unobstructed space for entry of lift truck elements and the like.

A further object is to provide a loading platform supporting leg which can be readily collapsed into a flatwise position when removed for storage and similarly readily erected to an operative position.

Other objects and advantages of this invention will be apparent to those skilled in the art upon a full and complete understanding of the construction and operation of this device.

This invention is embodied in a loading pallet and in a novel supporting structure therefor. The loading receiving platform is provided with a spaced pair of parallel holding slots with a locking slot therebetween positioned parallel and equidistant from the holding slots. The supporting structure is provided with opposing pairs of upstanding side walls, the upper edges of the side walls being in normal contacting relation with the underside of the load receiving platform, each of the upper margins of one opposing pair of side walls having a holding flap connected thereto, said holding flaps being positioned upwardly through the holding slots in the platform and placed in flatwise relation with the upper face thereof, a tab connected to the outer margin of the holding flap and positioned downwardly through the locking slot, bracing flaps connected to the upper margins of the other opposing pair of side walls and folded angularly inwardly and downwardly, the side edges of the bracing flaps normally contacting the inner faces of the adjacent side walls and the lower edges of the bracing flaps being in co-planar relation with the bottom edges of the side walls and parallel and equidistant from the side walls to which they are connected, the outer free edges of the locking and stiffening tabs normally contacting the bracing flaps.

The invention also consists in the parts and in the arrangements and combinations of parts hereinafter described and claimed. In the accompanying drawings which form part of this specification, like numerals and symbols refer to like parts wherever they occur.

Figure 2:
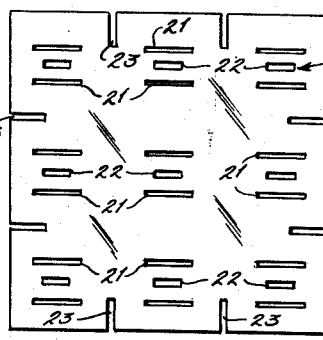
Figure 3:
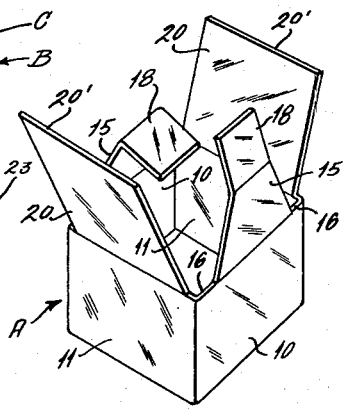
Figure 4:
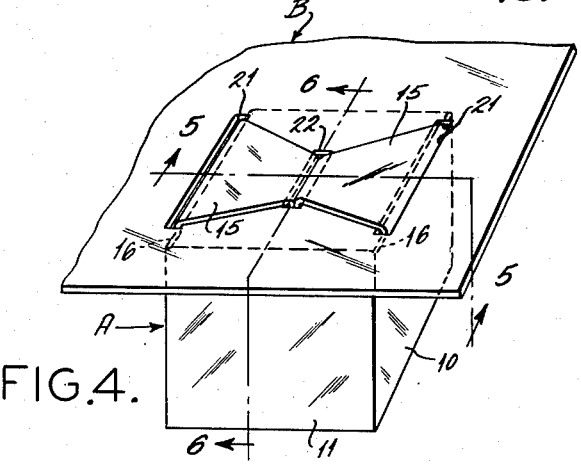
Figure 5:
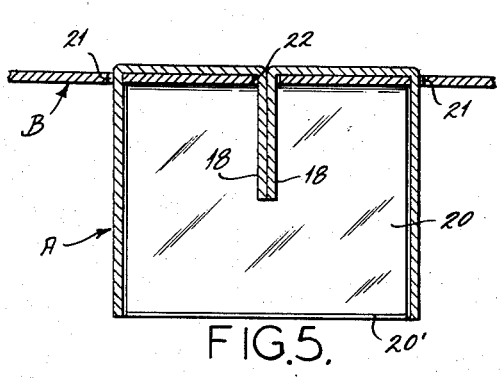
Figure 6:
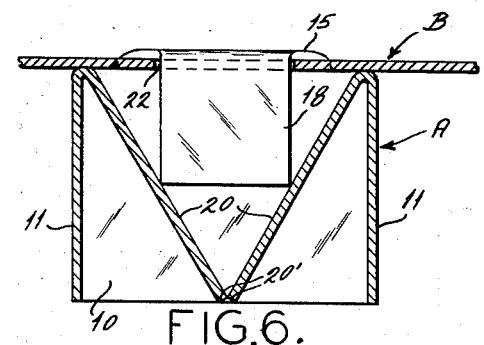
Figure 7:
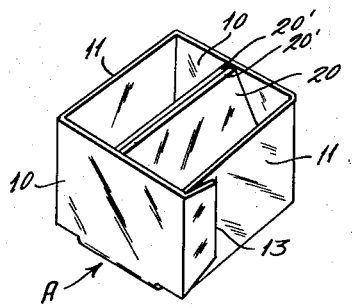
Figure 8:
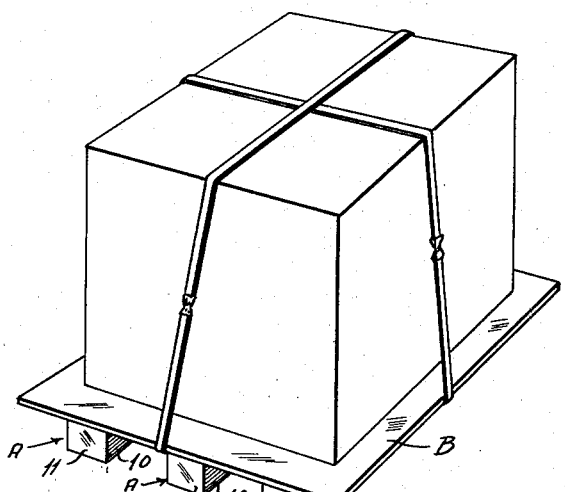
Figure 9:
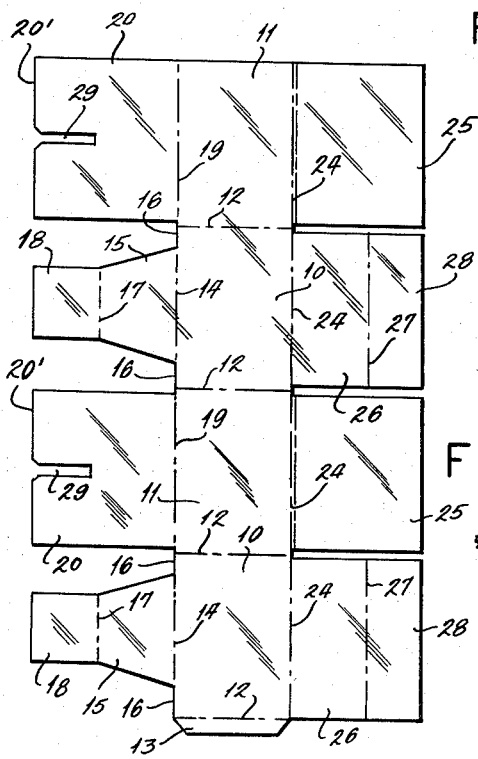
Figure 10:
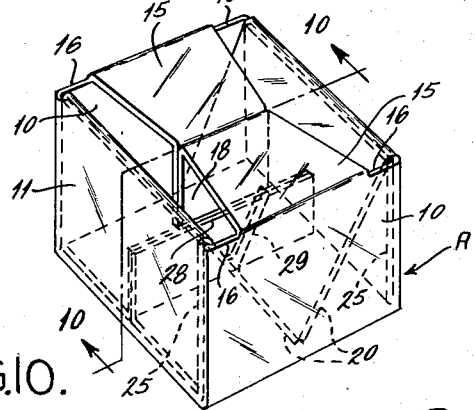
Figure 11:
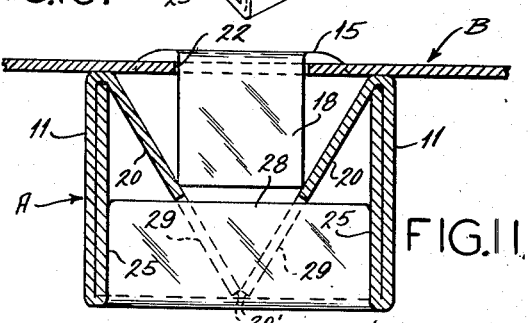

Fig. 1 is a plan view of a blank for a supporting member,

Fig. 2 is a plan view of a slotted load receiving platform showing a preferred placement of slots therethrough, Fig. 3 is a perspective view of a supporting member embodying a preferred form of the invention. The bracing flaps and the holding flaps and the locking and stiffening tabs are shown in the open or unassembled position, Fig. 4 is a fragmentary perspective view of a loading platform and an attached supporting member employing a preferred form of this invention, Fig. 5 is a fragmentary cross-sectional view on the line 5—5 of Fig. 4 showing the supporting leg and the loading platform, Fig. 6 is a fragmentary cross-sectional view on the line 6—6 of Fig. 4, Fig. 7 is a perspective view of the underside of a supporting member employing a preferred embodiment of this invention, Fig. 8 is a perspective view of a pallet and supporting legs employing a preferred form of this invention with a load positioned and strapped thereon, Fig. 9 is a plan view of a blank for a modified form of the supporting member, Fig. 10 is a perspective view of the modified supporting member shown in folded position, and Fig. 11 is a vertical cross-sectional view on the line 11—11 of Fig. 10.

Figures 1, 3, 4, 5 and 6 illustrate a supporting structure A having side walls 10 and end walls 11. In the preferred embodiment of the invention shown, the walls 10 and 11 are of rectangular outline and foldably connected along end scores 12. A glue or stitch flap 13 (Fig. 1) for interconnecting the walls of the supporting structure A is also foldably connected along an end score 12. The glue or stitch flap 13 may be omitted if other fastening means such as tape is used. Each side wall 10 is provided with a side wall top score 14 which in turn defines the base edge of a tapered holding flap 15. The holding flap 15 may be of any convenient width at its base, however, the preferred width is slightly less than the upper edge of the side walls 10 so as to leave supporting shoulders 16. The inner edge of each holding flap 15 is provided with a flap score 17 which in turn defines the edge of a rectangular locking and stiffening tab 18. The flap score 17 is preferably parallel to the side wall top score 14. The upper margin of each of the end walls 11 is provided with an end wall top score 19 in co-linear relation with the supporting shoulder 16 and the side wall top scores 14. The end wall top scores 19 define the inner margin of rectangular bracing panels 20, which have free outer edges 20'. In this preferred embodiment the length of the bracing panels 20 is substantially equal to the length of the end walls 11.

A load receiving platform B, as best shown in Fig. 2, is provided with spaced series of slots C adapted for receiving the connecting portions of the supporting structure A. Each series of slots C is provided with two relatively long holding slots 21. The holding slots are substantially equal in size and disposed in spaced parallel relation to each other a distance substantially equal to the distance between the side walls 10 of the supporting structure A. The length of the holding slots 21 is preferably slightly greater than the length of the base of the holding flap 15. A central locking slot 22 is provided midway between the holding slots 21. The locking slot 22 is slightly longer than the width of the locking and stiffening tab 18. In the embodiment shown, the width of the holding slot 21 is just slightly greater than the thickness of the holding flap 15 while the width of the locking slot 22 is slightly greater than twice the thickness of the locking and stiffening tabs 18. The series of slots C are spaced in the load receiving platform in any convenient pattern, however it is preferred that they be spaced so as to position the supporting structures to provide unobstructed passageways for lifting elements of fork truck, and the like. Preferably passageways shall be provided so that lifting elements may be admitted from all sides of the platform. The number and spacing of the series of slots may also be varied to accommodate different weight loads, etc. For convenience strap slots 23 may be provided in the margins of the load receiving platform B. These slots 23 aid the securing of narrow loads to the platform B by straps. The load receiving platform B may also be provided with one or more scores parallel to the side edges thereof, said scores being adapted to facilitate the bending of the outer margins of the platform B to aid the securing of narrow loads by straps.

A preferred form of erecting the supporting structure A is to fold the side walls 10 about the end scores 12 into right angular relation with the end walls 11. In this position, the walls 10 and 12 will form an enclosed rectangular structure. The glue or stitch flap 13 is then positioned on the outer margin of the adjacent wall and secured thereto by glue, stitches or any other suitable means. Each bracing panel 20 is then folded about the end wall top scores 19 into the rectangular enclosure angularly downwardly and inwardly until their lower free edges 20' are in adjacent relation substantially midway between the end walls 11. In this position the lower free edges 20' of the bracing panels 20 are in coplanar relation with the bottom edges of the supporting side walls 10 and 11. The length of the side walls 10 is preferably slightly greater than the dimension of the bracing panels 20 from its free outer edge 20' to the end wall top score 19 so as to permit bracing panels 20 to be folded inwardly into the supporting structure without contacting and interfering with the upper margin of the opposing end wall 11. The supporting member A is now in the preassembled position ready for attachment to the load receiving platform B. The lock and stiffening tabs 18 and the holding flaps 15 are moved upwardly through the holding slots 21 until the supporting shoulders 16 contact the lower face of the load receiving platform B. The locking and stiffening tabs 18 are bent inwardly and downwardly into right angular relation to the holding flaps 15. With the locking and stiffening tab 18 in this position, they are then inserted or forced downwardly through the locking slot 22 until the underface of the holding flap 15 is in flatwise relation with the upper face of the load receiving platform B. In this position the locking and stiffening tabs are in flatwise, substantially vertical relation with each other, and the lower corners thereof are in contact with the slanting upper faces of the previously positioned bracing panels 20. The supporting member or structure A is now securely connected to the load receiving platform B and is in condition for use.

In the preferred embodiment of the invention, the raw bottom edges of the side and end walls 10 and 11 resist sliding and slipping in all directions. In addition, the raw free edges 20' of the bracing panels 20 further resist sliding and slipping in most directions and act as a brake against sliding or slipping in a direction perpendicular or nearly perpendicular to the end wall 11. The braking action occurs by reason of one of the angularly inclined bracing panels 20 engaging or biting into said surface and resisting motion.

The supporting structure A may be removed from the load receiving platform B by reversing the above described process, namely by pulling the locking and stiffening tabs upwardly through the locking slots 22 and then forcing the holding flaps and the connected locking and stiffening tabs downwardly through the holding slots 21.

If it is desired to permanently connect the supporting structures to the load receiving platform, the holding flaps may be glued or stitched or otherwise fixed to the platform.

The shape and outline of the elements of the preferred embodiment herein described may be varied and still fall within the intended limits of the invention. For example, the outer free corners of locking and stiffening tabs may be cut or beveled so as to contact a greater portion of the upper face of the bracing panels 20, or slots or similar openings may be cut in the bracing panels 20 to receive the corners of the locking and stiffening tabs 18.

If it is desired to provide a construction more resistant to moisture and the like, caps of plastic, fibreboard or other suitable material may be secured to the bottom of each supporting structure.

A modified form of supporting structure is shown in Figures 9, 10 and 11. This variation is an example of a heavy duty supporting structure having reinforced walls and bottom. A bottom score line 24 defines the lower edge of the side walls 10 and the end walls 11. An alternate pair of side reinforcing flaps 25 is foldably connected along the bottom score line 24 to the end walls 11. The side reinforcing flaps 25 are preferably co-extensive in length with the bottom margin of the end walls 11 and co-extensive in height with the height of the end walls 11. Bottom flaps 26 are foldably connected along score line 24 to the lower margin of the side walls 10. A bottom flap score 27 is provided in parallel relation to the bottom score 24. The bottom flap score 27 is spaced from the bottom score 24 a distance equal to the distance between the side wall top score 14 and the flap score 17. A supporting flap 28 is provided foldably connected to the bottom flaps 26 along the bottom flap score 27. Supporting flap slots 29 are provided in the outer free margin of the bracing panels 20 substantially midway the ends thereof. The supporting flap slots 29 are substantially equal to the width of the supporting flaps 28.

When the modified form of the supporting leg is erected, the side reinforcing flaps 25 are folded about the bottom score 24 into flatwise relation with the inner face of the end walls 11. The supporting flaps 28 are then folded inwardly about the bottom flap score 17 into right angular relation with the bottom flaps 26. The bottom flaps 26 are then folded inwardly about the bottom score 24 into right angular relation with the side walls 10. In this position, the supporting flaps 28 are in flatwise side by side relation. The remainder of the components of the modified supporting leg are erected as set forth in the description of the preferred form of the invention. When the modified supporting leg is finally erected, the lower free edges of the locking and stiffening tabs 18 are in co-planar abutting relation with the outer free edges of the supporting flap 28, and the edges of the supporting flap slots 29 embrace the outer faces of the supporting flaps 28.

What I claim is:

1. A supporting structure for a loading pallet comprising two opposing pairs of right angularly connected rectangular supporting side walls forming a vertical suporting column, each of the upper margins of one opposing pair of said supporting side walls being provided with a right angularly disposed foldably connected holding flap, a tab foldably connected to each of said holding flaps, each of the second opposing pair of said supporting side walls being provided with a flat substantially rectangular bracing panel foldably connected to the upper margin thereof, said bracing panels being inclined inward and downward, the side edges of said bracing panels normally contacting the inner faces of said first pair of supporting walls throughout substantially their entire height, the outer lower free edge of said bracing panels being in co-planar relation with the lower edges of said supporting column and parallel and equidistant from the said second opposing pair of supporting side walls, the outer free edges of said tabs contacting said inclined bracing panels.

2. The supporting structure set forth and claimed in claim 1 wherein the outer margins of said holding flaps are positioned in parallel abutting relation with each other, and wherein said tabs are disposed in parallel flatwise relation to each other.

3. The supporting structure set forth and claimed in claim 2 wherein the free outer corners of said tabs are disposed in firmly contacting normal relation with the upper faces of the said bracing panels.

4. The supporting structure set forth and claimed in claim 3 wherein the outer free edges of said bracing panels are in abutting relation throughout substantially the entire length thereof.

5. The combination set forth in claim 4 wherein the width of said holding flap tapers from the foldable connection with said adjacent upper margin of said supporting side walls to said foldable connection with said tab, and wherein supporting shoulders are provided on the end edges of the supporting walls adjacent said foldable connection between said holding flaps and said supporting walls.

6. A loading pallet comprising a load receiving platform and a detachable multi-sided supporting structure therefor, said platform having series of slots therethrough to position and retain said supporting structure, each of said series of slots comprising a pair of spaced parallel slots, said supporting structure comprising a plurality of rectangular supporting side walls forming a vertical supporting column, the upper margins of alternate supporting side walls being provided with right angularly disposed foldably connected holding flaps, said holding flaps being disposed through one of said holding slots and positioned flatwise against the upper face of said load receiving platform, the outer margin of each of said holding flaps being provided with a tab disposed through said other holding slot thereby connecting said load receiving platform and said supporting structure.

7. A loading pallet comprising a load receiving platform and a detachable supporting structure therefor, said platform having series of slots therethrough to position and retain said supporting structure, each of said series of slots comprising a spaced parallel pair of outer holding slots of substantially equal lengths and a locking slot equidistant from and parallel to said outer holding slots, said supporting structure comprising two opposing pairs of right angularly connected rectangular supporting side walls forming a vertical supporting column, one opposing pair of said supporting side walls having shoulders thereon in normal contacting relation with the underface of said load contacting platform, the upper edges of said one opposing pair of supporting side walls each being provided with a right angularly disposed foldably connected holding flap, said holding flaps being disposed through said outer holding slots and positioned inwardly flatwise against the upper face of said load receiving platform, the outer margin of each of said holding flaps being provided with a tab foldably and right angularly downwardly disposed through said locking slot, each of the second opposing pair of said supporting side walls being provided with a substantially rectangular bracing panel foldably connected to the upper margin thereof, said foldable connection being in flatwise contacting relation with the underface of said load contacting platform, said bracing panels being disposed angularly inward and downward, the side edges of said bracing panels normally contacting the inner faces of said first pair of supporting walls, the outer free edge of said bracing panels being in coplanar relation with the lower edges of said supporting column parallel and equidistant from the said second opposing pair of supporting side walls, the outer free edges of said tabs being in normal edgewise contact with side angularly disposed bracing panels.

8. A blank for a supporting structure for a loading pallet comprising two alternate pairs of substantially rectangular supporting walls of substantially equal height, said walls being foldably connected along their side margins, the upper margins of one alternate pair of said supporting walls being provided with foldably connected holding flaps, each of said holding flaps having an outer margin substantially parallel to the upper margins of said alternate pair of supporting walls, a tab foldably connected to each of said holding flaps, each of said alternate pair of supporting walls being provided at its lower edge with a foldably connected substantially co-extensive bottom flap having a foldably connected supporting flap thereon, each of said other alternate pair of supporting walls having a substantially rectangular bracing panel foldably connected thereto along its upper margin and a substantially rectangular side reinforcing flap foldably connected thereto along its lower margin, said bracing panels being provided with supporting flap receiving slots disposed substantially midway the length of the free outer margin.

9. A supporting structure for a loading pallet comprising two opposing pairs of right angularly connected rectangular supporting side walls forming a vertical supporting column, each of the upper margins of one opposing pair of said supporting side walls having a right angularly disposed foldably connected holding flap, said holding flaps having an outer margin disposed substantially parallel to the upper margin of said foldably connected adjacent side walls, a tab foldably and right angularly downwardly connected to said outer margin of each of said holding flaps, the lower margins of said opposing pair of side walls being provided with foldably and right angularly inwardly connected bottom flaps, each of said bottom flaps having a supporting flap foldably connected thereto, the second opposing pair of said supporting side walls each having a substantially rectangular bracing panel foldably connected to the upper margin thereof, said bracing panels being disposed angularly inward and downward, the side edges of said bracing panels normally contacting the inner faces of said first pair of supporting walls, the outer free edge of said bracing panels being in co-planar relation with the lower edges of said supporting column and parallel and equidistant from the said second opposing pair of supporting side walls, the outer free edges of said tab being in contact with said angularly disposed bracing panels, the outer free margin of the said bracing panels being slotted, the edges of said bracing panel forming said slots firmly engaging the side faces of the said upturned supporting flaps, the lower edge of the second pair of supporting side walls being provided with a foldably connected side reinforcing flap disposed upwardly in flatwise relation with the inner face of the adjacent supporting side wall.

References Cited in the file of this patent

UNITED STATES PATENTS

| Number | Name | Date |
|---|---|---|
| 2,494,730 | Thursby | Jan. 17, 1950 |
| 2,531,090 | Turner | Nov. 21, 1950 |
| 2,609,136 | Sider | Sept. 2, 1952 |